United States Patent
Tsuji

(10) Patent No.: US 11,542,375 B2
(45) Date of Patent: Jan. 3, 2023

(54) METHOD FOR PRODUCING LOW MOLECULAR WEIGHT POLYTETRAFLUOROETHYLENE

(71) Applicant: DAIKIN INDUSTRIES, LTD., Osaka (JP)

(72) Inventor: Masayuki Tsuji, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 220 days.

(21) Appl. No.: 16/966,919

(22) PCT Filed: Feb. 5, 2019

(86) PCT No.: PCT/JP2019/003936
§ 371 (c)(1),
(2) Date: Aug. 3, 2020

(87) PCT Pub. No.: WO2019/156038
PCT Pub. Date: Aug. 15, 2019

(65) Prior Publication Data
US 2021/0371603 A1 Dec. 2, 2021

(30) Foreign Application Priority Data

Feb. 7, 2018 (JP) ................. JP2018-020457

(51) Int. Cl.
C08F 2/46 (2006.01)
C08F 2/50 (2006.01)
C08G 61/04 (2006.01)
C08J 3/28 (2006.01)
C08F 8/50 (2006.01)

(52) U.S. Cl.
CPC ........... C08J 3/28 (2013.01); C08F 8/50 (2013.01); *C08J 2327/18* (2013.01)

(58) Field of Classification Search
CPC . C08J 3/28; C08J 2327/18; C08F 8/50; C08F 214/26; C08F 114/26
USPC .............. 522/156, 155, 150, 1; 520/1
See application file for complete search history.

(56) References Cited

U.S. PATENT DOCUMENTS

2019/0023856 A1* 1/2019 Yoshida ............... C08J 3/28

FOREIGN PATENT DOCUMENTS

| CN | 103172880 | * | 2/2015 | |
|---|---|---|---|---|
| CN | 103172880 B | | 2/2015 | |
| JP | 4-91134 A | | 3/1992 | |
| JP | 10-147617 A | | 6/1998 | |
| JP | 2002-327067 A | | 11/2002 | |
| JP | 200663140 A | | 3/2006 | |
| WO | WO-2018026012 A1 | * | 2/2018 | C08F 14/26 |

OTHER PUBLICATIONS

Gu et al, CN 103172880 Machine Translation, Feb. 4, 2015 (Year: 2015).*
Roland E. Florin et al., "Gamma Irradiation of Fluorocarbon Polymers", Journal of Research of the National Bureau of Standards—A. Physics and Chemistry, vol. 65A, No. 4, Jul.-Aug. 1961, pp. 375-387 (13pages total).
Ze Zhang et al., "Complete mineralization of perfluorooctanoic acid (PFOA) by γ-irradiation in aqueous solution", Scientific Reports, vol. 4, No. 7418, 2014, pp. 1-6 (6 pages total).
International search report for PCT/JP2019/003936 dated Apr. 23, 2019.
Lunkwitz et al., "Modification of perfluorinated polymers by high-energy irradiation", Journal of Fluorine Chemistry, vol. 125, 2004, pp. 863-873.
Communication dated Jul. 15, 2021 by the European Patent Office in application No. 19750706.4.
International Preliminary Report on Patentability dated Aug. 11, 2020 and Written Opinion from the International Bureau in International Application No. PCT/JP2019/003936.

* cited by examiner

*Primary Examiner* — Jessica Whiteley
(74) *Attorney, Agent, or Firm* — Sughrue Mion, PLLC

(57) ABSTRACT

The disclosure provides a method for producing low molecular weight polytetrafluoroethylene containing less C6-C14 perfluorocarboxylic acids or salts thereof. The method for producing low molecular weight polytetrafluoroethylene includes: (1) irradiating high molecular weight polytetrafluoroethylene to provide low molecular weight polytetrafluoroethylene having a melt viscosity of $1.0 \times 10^2$ to $7.0 \times 10^5$ Pa·s at 380° C.; and (2) irradiating the low molecular weight polytetrafluoroethylene to a dose that does not decompose the low molecular weight polytetrafluoroethylene.

6 Claims, No Drawings

METHOD FOR PRODUCING LOW MOLECULAR WEIGHT POLYTETRAFLUOROETHYLENE

CROSS-REFERENCE TO RELATED APPLICATIONS

This application is a National Stage of International Application No. PCT/JP2019/003936 filed on Feb. 5, 2019, which claims priority under U.S.C. § 119(a) to Japanese Patent Application No. JP 2018-020457 filed on Feb. 7, 2018.

TECHNICAL FIELD

The disclosure relates to methods for producing low molecular weight polytetrafluoroethylene.

BACKGROUND ART

Low molecular weight polytetrafluoroethylene (also referred to as "polytetrafluoroethylene wax" or "polytetrafluoroethylene micro powder") having a molecular weight of several thousands to several hundreds of thousands has excellent chemical stability and a very low surface energy, as well as low fibrillatability. Thus, low molecular weight polytetrafluoroethylene is used as an additive for improving the smoothness and the texture of film surfaces in production of articles such as plastics, inks, cosmetics, coatings, and greases (for example, see Patent Literature 1).

Examples of known methods for producing low molecular weight polytetrafluoroethylene include polymerization, radiolysis, and pyrolysis. In the radiolysis, conventionally, it has been common that high molecular weight polytetrafluoroethylene is irradiated in the air atmosphere to provide low molecular weight polytetrafluoroethylene.

CITATION LIST

Patent Literature

Patent Literature 1: JP H10-147617 A

SUMMARY OF INVENTION

Technical Problem

The disclosure aims to provide a method for producing low molecular weight polytetrafluoroethylene containing less C6-C14 perfluorocarboxylic acids or salts thereof.

Solution to Problem

The disclosure relates to a method for producing low molecular weight polytetrafluoroethylene, including: (1) irradiating high molecular weight polytetrafluoroethylene to provide low molecular weight polytetrafluoroethylene having a melt viscosity of $1.0 \times 10^2$ to $7.0 \times 10^5$ Pa·s at 380° C.; and (2) irradiating the low molecular weight polytetrafluoroethylene to a dose that does not decompose the low molecular weight polytetrafluoroethylene.

The dose in the step (2) is preferably 0.1 to 25 kGy.

The low molecular weight polytetrafluoroethylene obtained after the step (2) is preferably substantially free from a C6-C14 perfluorocarboxylic acid and its salt.

The high molecular weight polytetrafluoroethylene preferably has a standard specific gravity of 2.130 to 2.230.

Both the high molecular weight polytetrafluoroethylene and the low molecular weight polytetrafluoroethylene are in the form of powder.

The production method preferably further includes (3) heating the high molecular weight polytetrafluoroethylene up to a temperature that is not lower than the primary melting point thereof to provide a molded article before the step (1), the molded article having a specific gravity of 1.0 g/cm$^3$ or higher.

Advantageous Effects of Invention

The disclosure provides a method for producing low molecular weight polytetrafluoroethylene containing less C6-C14 perfluorocarboxylic acids and salts thereof.

DESCRIPTION OF EMBODIMENTS

The disclosure will be specifically described hereinbelow.

The production method of the disclosure includes: (1) irradiating high molecular weight polytetrafluoroethylene (PTFE) to provide low molecular weight PTFE having a melt viscosity of $1.0 \times 10^2$ to $7.0 \times 10^5$ Pa·s at 380° C.; and (2) irradiating the low molecular weight PTFE to a dose that does not decompose the low molecular weight PTFE.

Irradiation of the high molecular weight PTFE under conventional irradiation conditions provides not only the low molecular weight PTFE having a higher melt viscosity than the high molecular weight PTFE but also C6-C14 perfluorocarboxylic acids or salts thereof. These compounds contains non-naturally occurring, difficult-to-decompose substances which are further indicated to have high bioaccumulation, i.e., perfluorooctanoic acid containing 8 carbon atoms and salts thereof, perfluorononanoic acid containing 9 carbon atoms and salts thereof, and perfluorodecanoic acid, perfluoroundecanoic acid, perfluorododecanoic acid, perfluorotridecanoic acid, and perfluorotetradecanoic acid respectively containing 10, 11, 12, 13, and 14 carbon atoms and salts thereof.

Irradiation of high molecular weight PTFE under conventional irradiation conditions unfortunately generates 25 ppb or more of perfluorooctanoic acid containing 8 carbon atoms or salts thereof.

In the production method of the disclosure, after reduction of the molecular weight (step (1)), irradiation to a comparatively low dose that does not decompose low molecular weight PTFE enables removal of the perfluorocarboxylic acids and salts thereof from the low molecular weight PTFE.

Low molecular weight PTFE may contain C6-C14 perfluorosulfonic acids or salts thereof. Such compounds also can be removed in the production method of the disclosure.

In the step (1), the irradiation of the high molecular weight PTFE can be carried out by a conventionally known method under conventionally known conditions.

Examples of the radiation include any ionizing radiation, such as electron beams, gamma rays, X rays, neutron beams, and high energy ions. Electron beams or gamma rays are preferred.

The radiation preferably has an exposure dose of 30 to 2500 kGy, more preferably 1000 kGy or lower, still more preferably 750 kGy or lower, while more preferably 50 kGy or higher. The exposure dose is determined in accordance with the molecular weight (standard specific gravity described later) of PTFE to be decomposed (reduction of the molecular weight).

The irradiation temperature may be any temperature within the range of 5° C. to the melting point of PTFE. It is known that the molecular chain of PTFE is crosslinked around the melting point thereof. The irradiation temperature is therefore preferably 320° C. or lower, more preferably 300° C. or lower, still more preferably 260° C. or lower, in order to provide low molecular weight PTFE. From an economic viewpoint, the irradiation is preferably performed at room temperature.

In the step (1), the irradiation may be performed in the same atmosphere as conventional irradiation, for example, in the air. In order to reduce the cost, the irradiation is preferably performed in the air.

The step (1) preferably provides particles of the low molecular weight PTFE having an average particle size of 500 μm or smaller. The average particle size of the low molecular weight PTFE is more preferably 300 μm or smaller, still more preferably 100 μm or smaller. The lower limit thereof may be, but is not limited to, greater than 30 μm. Low molecular weight PTFE particles having an average particle size within the above range can easily provide powder of low molecular weight PTFE having a relatively small average particle size.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 1.0 bar without cascade impaction.

The irradiation in the step (2) is performed to a dose that does not decompose the low molecular weight PTFE obtained in the step (1). After the irradiation for reducing the molecular weight (decomposing) high molecular weight PTFE in the step (1), irradiation to a relatively low dose that does not decompose the low molecular weight PTFE is performed. Thus, C6-C14 perfluorocarboxylic acids and salts thereof generated in the step (1) can be removed.

The radiation preferably has an exposure dose of preferably 0.1 to 25 kGy, more preferably 20 kGy or lower, still more preferably 15 kGy or lower, while more preferably 0.5 kGy or higher, still more preferably 1.0 kGy or higher.

The type of the radiation, the irradiation temperature, and the atmosphere for the irradiation in the step (2) may be the same as those for the irradiation in the step (1).

The production method of the disclosure may further include (3) heating the high molecular weight PTFE up to a temperature that is not lower than the primary melting point thereof to provide a molded article before the step (1). In this case, the molded article obtained in the step (3) can be used as the high molecular weight PTFE in the step (1). The primary melting point is preferably 300° C. or higher, more preferably 310° C. or higher, still more preferably 320° C. or higher. The primary melting point means the maximum peak temperature on an endothermic curve present on the crystal melting curve when unsintered high molecular weight PTFE is analyzed with a differential scanning calorimeter. The endothermic curve is obtainable by increasing the temperature at a temperature-increasing rate of 10° C./min using a differential scanning calorimeter.

The molded article in the step (3) preferably has a specific gravity of 1.0 g/cm$^3$ or higher, more preferably 1.5 g/cm$^3$ or higher, while preferably 2.5 g/cm$^3$ or lower. When the specific gravity of the molded article is within the above range, pores or irregularities on the surface are reduced, resulting in production of low molecular weight PTFE having a small specific surface area.

The specific gravity can be determined by water displacement.

The production method of the disclosure may further include pulverizing the molded article to provide powder of the PTFE after the step (3). The molded article may be first coarsely and then finely pulverized.

The production method of the disclosure may further include (4) pulverizing the low molecular weight PTFE obtained after the step (2). This can provide powder of low molecular weight PTFE having a small average particle size.

Next, the high molecular weight PTFE to be irradiated in the step (1) and the low molecular weight PTFE to be obtained after the irradiation in the production method of the disclosure are described hereinbelow.

The low molecular weight PTFE has a melt viscosity of $1.0 \times 10^2$ to $7.0 \times 10^5$ Pa·s at 380° C. The term "low molecular weight" herein means that the melt viscosity is within this range.

The melt viscosity is preferably $1.5 \times 10^3$ Pa·s or more, while preferably $3.0 \times 10^5$ Pa·s or less, more preferably $1.0 \times 10^5$ Pa·s or less.

The melt viscosity is a value determined by heating a 2-g sample at 380° C. for five minutes in advance and then keeping this sample at this temperature under a load of 0.7 MPa using a flow tester (Shimadzu Corp.) and a 2 φ-8 L die in conformity with ASTM D1238.

The high molecular weight PTFE to be irradiated preferably has a standard specific gravity (SSG) of 2.130 to 2.230. The standard specific gravity (SSG) is a value determined in conformity with ASTM D 4895.

The high molecular weight PTFE has a significantly higher melt viscosity than the low molecular weight PTFE, and thus the melt viscosity thereof is difficult to measure accurately. In contrast, the melt viscosity of the low molecular weight PTFE is measurable, but the low molecular weight PTFE has difficulty in providing a molded article usable for measurement of standard specific gravity. Thus, the standard specific gravity thereof is difficult to measure accurately. Therefore, in the disclosure, the standard specific gravity is used as an indicator of the molecular weight of the high molecular weight PTFE to be irradiated, while the melt viscosity is used as an indicator of the molecular weight of the low molecular weight PTFE. For both the high molecular weight PTFE and the low molecular weight PTFE, no method for determining the molecular weight directly has been known so far.

The low molecular weight PTFE has a melting point of preferably 320° C. to 340° C., more preferably 324° C. to 336° C.

The melting point is defined using a differential scanning calorimeter (DSC) as follows. Specifically, temperature calibration is performed in advance with indium and lead as standard samples. Then, about 3 mg of low molecular weight PTFE is put into an aluminum pan (crimped container), and the temperature is increased at a rate of 10° C./min within the temperature range of 250° C. to 380° C. under air flow at 200 ml/min. The minimum point of the heat of fusion within this region is defined as the melting point.

In the production method of the disclosure, the high molecular weight PTFE may be in any form, such as powder, a molded article of the high molecular weight PTFE, or shavings generated by cutting the molded article of the high molecular weight PTFE. The high molecular weight PTFE in the form of powder can easily provide powder of the low molecular weight PTFE.

The low molecular weight PTFE obtainable by the production method of the disclosure may be in any form, and is preferably in the form of powder.

When the low molecular weight PTFE obtainable by the production method of the disclosure is in the form of powder, the specific surface area thereof is preferably 0.5 to 20 m$^2$/g. The specific surface area is more preferably 7.0 m$^2$/g or larger.

For the low molecular weight PTFE powder, both of the following two types are demanded, i.e., a small specific surface area type having a specific surface area of not smaller than 0.5 m$^2$/g but smaller than 7.0 m$^2$/g and a large specific surface area type having a specific surface area of not smaller than 7.0 m$^2$/g but smaller than 20 m$^2$/g.

The low molecular weight PTFE powder of a small specific surface area type has an advantage of easy dispersion in a matrix material such as coating. In contrast, such powder disperse in a matrix material with a large dispersed particle size, i.e., with poor fine dispersibility.

The low molecular weight PTFE powder of a small specific surface area type preferably has a specific surface area of 1.0 m$^2$/g or larger, while preferably 5.0 m$^2$/g or smaller, more preferably 3.0 m$^2$/g or smaller. Suitable examples of the matrix material include plastics and inks, as well as coatings.

The low molecular weight PTFE powder of a large specific surface area type, when dispersed in a matrix material such as coating, has advantages of high surface-modifying effects, such as a small dispersed particle size in a matrix material and improved texture of the film surface, and a large amount of oil absorption. In contrast, such powder may not be easily dispersed in a matrix material (e.g., take a long time for dispersion), and may cause an increased viscosity of coating, for example.

The low molecular weight PTFE powder of a large specific surface area type preferably has a specific surface area of 8.0 m$^2$/g or larger, while preferably 25 m$^2$/g or smaller, more preferably 20 m$^2$/g or smaller. Suitable examples of the matrix material include oils, greases, and coatings, as well as plastics.

The specific surface area is determined by the BET method using a surface analyzer (trade name: BELSORP-mini II, MicrotracBEL Corp.), a gas mixture of 30% nitrogen and 70% helium as carrier gas, and liquid nitrogen for cooling.

When the low molecular weight PTFE obtainable by the production method of the disclosure is in the form of powder, the average particle size thereof is preferably 0.5 to 200 μm, more preferably 50 μm or smaller, still more preferably 25 μm or smaller, particularly preferably 10 μm or smaller, further more preferably 5 μm or smaller. The lower limit thereof may be 1.0 μm. As mentioned here, powder having a relatively small average particle size, when used as an additive for coating, for example, can provide a film having much better surface smoothness.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 1.0 bar without cascade impaction.

The production method of the disclosure can provide low molecular weight PTFE substantially free from C6-C14 perfluorocarboxylic acids and salts thereof after the step (2). The low molecular weight PTFE obtainable by the production method of the disclosure preferably contains C6-C14 perfluorocarboxylic acids and salts thereof in a total amount by mass of not more than 50 ppb, more preferably less than 25 ppb, still more preferably not more than 15 ppb, still further preferably not more than 10 ppb, particularly preferably not more than 5 ppb, most preferably less than 5 ppb. The lower limit of the amount may be any value, and may be lower than the detection limit.

The amount of the perfluorocarboxylic acids and salts thereof can be determined by liquid chromatography.

The low molecular weight PTFE obtainable by the production method of the disclosure is also characterized in that it is substantially free from perfluorooctanoic acid and salts thereof. The low molecular weight PTFE obtainable by the production method of the disclosure preferably contains perfluorooctanoic acid and salts thereof in an amount by mass of less than 25 ppb. This amount is more preferably not more than 15 ppb, still more preferably not more than 10 ppb, still further preferably not more than 5 ppb, particularly preferably less than 5 ppb. The lower limit may be any value, and may be lower than the detection limit.

The amount of perfluorooctanoic acid and salts thereof can be determined by liquid chromatography.

The low molecular weight PTFE obtainable by the production method of the disclosure is also characterized in that it is substantially free from C6-C14 perfluorosulfonic acids and salts thereof. The low molecular weight PTFE obtainable by the production method of the disclosure preferably contains C6-C14 perfluorosulfonic acids and salts thereof in a total amount by mass of less than 25 ppb, more preferably not more than 15 ppb, still more preferably not more than 10 ppb, still further preferably not more than 5 ppb, particularly preferably less than 5 ppb. The lower limit thereof may be any value, and may be lower than the detection limit.

The amount of perfluorosulfonic acids and salts thereof can be determined by liquid chromatography.

The low molecular weight PTFE preferably contains 30 or more carboxyl groups at ends of the molecular chain per 10$^6$ carbon atoms in the main chain. The number of carboxyl groups is more preferably 35 or more per 10$^6$ carbon atoms in the main chain. The upper limit of the number of carboxyl groups may be any value, and is preferably 500, more preferably 350, per 10$^6$ carbon atoms in the main chain, for example. The carboxyl groups may be generated at ends of the molecular chain of the low molecular weight PTFE by the aforementioned irradiation of the high molecular weight PTFE in the presence of oxygen, for example. The number of carboxyl groups after irradiation increases in accordance with the amount of modification in the high molecular weight PTFE. As the low molecular weight PTFE contains 30 or more carboxyl groups at ends of the molecular chain per 10$^6$ carbon atoms in the main chain, it can have excellent dispersibility in molding materials, inks, cosmetics, coatings, greases, components for office automation devices, toner-modifying additives, additives for plating solutions, and others. For example, micro powder is blended into hydrocarbon-based matrix resins, inks, and coatings for the purpose of improving the slidability, reducing the abrasion loss, preventing squeal, and improving the water and oil repellency. However, such micro powder, which is a perfluororesin, is originally poor in compatibility with matrix resins, inks, and coatings, and thus is difficult to disperse uniformly. In contrast, micro powder produced by irradiating and decomposing high molecular weight PTFE generates perfluorooctanoic acid (PFOA) and salts thereof and carboxyl groups as by-products due to the production method thereof. Carboxyl groups present at ends and other positions in the resulting micro powder consequently act as dispersants for hydrocarbon-based matrix resin, inks, and coatings.

The number of carboxyl groups is a value determined by the method described below. The detection limit of this method is 0.5.

(Measurement Method)

The following measurement is performed in conformity with the method of analyzing end groups disclosed in JP H04-20507 A.

Low molecular weight PTFE powder is preformed with a hand press to provide a film having a thickness of about 0.1 mm. The resulting film is subjected to infrared absorption spectrum analysis. PTFE with completely fluorinated ends by contact with fluorine gas is also subjected to infrared absorption spectrum analysis. Based on the difference spectrum therebetween, the number of carboxyl end groups is calculated by the following formula.

Number of carboxyl end groups(per $10^6$ carbon atoms)=$(l \times K)/t$ l: absorbance
K: correction coefficient
t: film thickness (mm)

The absorption frequency and correction coefficient of the carboxyl group are respectively set to 3560 cm$^{-1}$ and 440.

The low molecular weight PTFE may contain, at ends of the molecular chain, unstable end groups derived from the chemical structure of a polymerization initiator or chain-transfer agent used in the polymerization reaction of PTFE. Examples of the unstable end groups include, but are not limited to, —CH$_2$OH, —COOH, and —COOCH$_3$.

The low molecular weight PTFE may undergo stabilization of the unstable end groups. The unstable end groups may be stabilized by any method, such as a method of exposing the unstable end groups to fluorine-containing gas to convert them into trifluoromethyl groups (—CF$_3$).

The low molecular weight PTFE may contain amidated ends. The end amidation may be performed by any method, such as a method of bringing fluorocarbonyl groups (—COF) obtained by exposure to fluorine-containing gas into contact with ammonia gas as disclosed in JP H04-20507 A, for example.

The low molecular weight PTFE with stabilization or end amidation of the unstable end groups as described above can be well compatible with opposite materials and have improved dispersibility when used as an additive for opposite materials such as coatings, greases, cosmetics, plating solutions, toners, and plastics.

The high molecular weight PTFE may be a homo-PTFE consisting only of a tetrafluoroethylene (TFE) unit or may be a modified PTFE containing a TFE unit and a modifying monomer unit based on a modifying monomer copolymerizable with TFE. In the production method of the disclosure, the composition of the polymer is not changed. Thus, the low molecular weight PTFE has the composition of the high molecular weight PTFE as it is.

In the modified PTFE, the proportion of the modifying monomer unit is preferably 0.001 to 1% by mass, more preferably 0.01% by mass or more, while more preferably 0.5% by mass or less, still more preferably 0.1% by mass or less, of all the monomer units. The term "modifying monomer unit" herein means a moiety that is part of the molecular structure of the modified PTFE and is derived from a modifying monomer. The term "all the monomer units" herein means all the moieties derived from monomers in the molecular structure of the modified PTFE. The proportion of the modifying monomer unit can be determined by any known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, unsaturated perfluoro compounds represented by the following formula (1):

$$CF_2=CF-ORf \tag{1}$$

wherein Rf is a perfluoroorganic group. The "perfluoroorganic group" herein means an organic group in which all the hydrogen atoms bonded to any carbon atom are replaced by fluorine atoms. The perfluoroorganic group may contain ether oxygen.

Examples of the perfluorovinyl ether include perfluoro (alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro (propyl vinyl ether) (PPVE) in which the perfluoroalkyl group is a perfluoropropyl group.

Examples of the perfluorovinyl ether also include those represented by the formula (1) in which Rf is a C4-C9 perfluoro(alkoxyalkyl) group, those represented by the formula (1) in which Rf is a group represented by the following formula:

[Chem. 1]
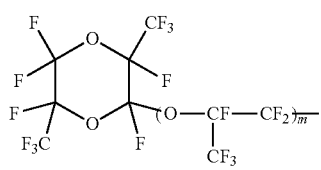

(wherein m is 0 or an integer of 1 to 4), and those represented by the formula (1) in which Rf is a group represented by the following formula:

[Chem. 2]
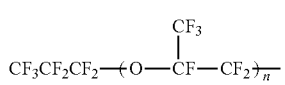

wherein n is an integer of 1 to 4.

Examples of the perfluoroalkylethylene include, but are not limited to, (perfluorobutyl)ethylene (PFBE), (perfluorohexyl)ethylene, and (perfluorooctyl)ethylene.

The modifying monomer in the modified PTFE is preferably at least one selected from the group consisting of HFP, CTFE, VDF, PPVE, PFBE, and ethylene. It is more preferably at least one selected from the group consisting of PPVE, HFP, and CTFE.

The low molecular weight PTFE obtainable by the production method of the disclosure can suitably be used as molding materials, inks, cosmetics, coatings, greases, components for office automation devices, additives for modifying toners, organic photoconductor materials for copiers, and additives for plating solutions, for example. Examples of the molding materials include engineering plastics such as polyoxybenzoyl polyester, polyimide, polyamide, polyamide-imide, polyacetal, polycarbonate, and polyphenylene sulfide. The low molecular weight PTFE is particularly suitable as a thickening agent for greases.

The low molecular weight PTFE can be used as additives for molding materials for improving the non-adhesiveness and slidability of rollers of copiers, for improving the texture of molded articles of engineering plastics, such as surface sheets of furniture, dashboards of automobiles, and covers of home appliances, and for improving the smoothness and abrasion resistance of machine elements generating mechanical friction, such as light-load bearings, gears, cams, buttons of push-button telephones, movie projectors, camera components, and sliding materials.

The low molecular weight PTFE can be used as additives for coatings for the purpose of improving the smoothness of varnish and paint. The low molecular weight PTFE and the powder can be used as additives for cosmetics for the purpose of improving the smoothness of cosmetics such as foundation.

The low molecular weight PTFE can also be suitably used for improving the oil or water repellency of wax and for improving the smoothness of greases and toners.

The low molecular weight PTFE can be used as electrode binders of secondary batteries and fuel cells, hardness adjusters for electrode binders, and water repellents for electrode surfaces.

The low molecular weight PTFE may be combined with a lubricant to provide grease. The grease is characterized by containing the low molecular weight PTFE and a lubricant. Thus, the low molecular weight PTFE is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low molecular weight PTFE in an amount of 0.1 to 60% by mass, more preferably 0.5% by mass or more, still more preferably 5% by mass or more, while preferably 50% by mass or less. A grease containing too large an amount of the low molecular weight PTFE may be too hard to provide sufficient lubrication. A grease containing too small an amount of the low molecular weight PTFE may fail to exert the sealability.

The grease may also contain any of additives such as solid lubricants, extreme pressure agents, antioxidants, oilness agents, anticorrosives, viscosity index improvers, and detergent dispersants.

EXAMPLES

The disclosure is more specifically described with reference to, but not limited to, examples.

The parameters in the examples were determined by the following methods.

Melt Viscosity

The melt viscosity was determined by heating a 2-g sample at 380° C. for five minutes in advance and then keeping this sample at this temperature under a load of 0.7 MPa using a flow tester (Shimadzu Corp.) and a 2 $\phi$-8 L die in conformity with ASTM D1238.

Amount of Perfluorooctanoic Acid and Salts Thereof (PFOA)

The amount of perfluorooctanoic acid and salts thereof was determined using a liquid chromatography-mass spectrometer (LC-MS ACQUITY UPLC/TQD, Waters). Measurement powder (1 g) was mixed with acetonitrile (5 ml) and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were passed at a predetermined concentration gradient (A/B=40/60 for 2 min and 80/20 for 1 min) as mobile phases. A separation column (ACQUITY UPLC BEH C18 1.7 μm) was used at a column temperature of 40° C. and an injection volume of 5 μL. Electrospray ionization (ESI) in a negative mode was used as the ionization method, and the cone voltage was set to 25 V. The ratio of the molecular weight of precursor ions to the molecular weight of product ions was measured to be 413/369. The amount of perfluorooctanoic acid and salts thereof was calculated by the external standard method. The detection limit of this measurement is 5 ppb.

Amount of C6-C14 Perfluorocarboxylic Acids and Salts Thereof (PFC)

C6-C14 perfluorocarboxylic acids and salts thereof were detected using a liquid chromatography-mass spectrometer (LC-MS ACQUITY UPLC/TQD, Waters). The solution used was the liquid phase extracted in the measurement of perfluorooctanoic acid, and the measurement was performed by MRM. The measurement conditions were based on the measurement conditions for perfluorooctanoic acid, but the concentration gradient was changed (A/B=10/90 for 1.5 min and 90/10 for 3.5 min). The ratio of the molecular weight of precursor ions to the molecular weight of product ions was measured to be 313/269 for perfluorohexanoic acid (C6), 363/319 for perfluoroheptanoic acid (C7), 413/369 for perfluorooctanoic acid (C8), 463/419 for perfluorononanoic acid (C9), 513/469 for perfluorodecanoic acid (010), 563/519 for perfluoroundecanoic acid (011), 613/569 for perfluorododecanoic acid (C12), 663/619 for perfluorotridecanoic acid (C13), and 713/669 for perfluorotetradecanoic acid (C14).

The total amount of C6-C14 perfluorocarboxylic acids and salts thereof was calculated from the amount (X) of the perfluorooctanoic acid obtained in the above measurement by the following formula. The detection limit of this measurement is 5 ppb.

$$(A_{c6}+A_{c7}+A_{c8}+A_{c9}+A_{c10}+A_{c11}+A_{c12}+A_{c13}+A_{c14})/A_{c8} \times X$$

$A_{c6}$: peak area of perfluorohexanoic acid
$A_{c7}$: peak area of perfluoroheptanoic acid
$A_{c8}$: peak area of perfluorooctanoic acid
$A_{c9}$: peak area of perfluorononanoic acid
$A_{c10}$: peak area of perfluorodecanoic acid
$A_{c11}$: peak area of perfluoroundecanoic acid
$A_{c12}$: peak area of perfluorododecanoic acid
$A_{c13}$: peak area of perfluorotridecanoic acid
$A_{c14}$: peak area of perfluorotetradecanoic acid X: amount of perfluorooctanoic acid calculated from the MRM measurement result by the external standard method Comparative Example 1

Commercially available homo-PTFE fine powder (standard specific gravity measured in conformity with ASTM D4895: 2.175, concentrations of PFC and PFOA are lower than the detection limit) was irradiated with 200 kGy of cobalt-60 γ-rays at room temperature in the air. Thereby, a low molecular weight PTFE powder was obtained.

The physical properties of the resulting low molecular weight PTFE powder were determined. The results are shown in Table 1.

Example 1

The low molecular weight PTFE powder obtained in Comparative Example 1 was irradiated with 1 kGy of cobalt-60 γ-rays at room temperature. Thereby, a low molecular weight PTFE powder was obtained.

The physical properties were determined in the same manner as in Comparative Example 1. The results are shown in Table 1.

Examples 2 to 4

Low molecular weight PTFE powders were obtained as in Example 1, except that the irradiation dose to the low molecular weight PTFE powder obtained in Comparative Example 1 was changed as shown in Table 1.

The physical properties of the obtained low molecular weight PTFE powders were determined in the same manner as in Comparative Example 1. The results are shown in Table 1.

Comparative Examples 2 to 4

Low molecular weight PTFE powders were obtained as in Comparative Example 1, except that the irradiation dose to homo-PTFE fine powder was changed as shown in Table 1.

The physical properties of the obtained low molecular weight PTFE powders were determined in the same manner as in Comparative Example 1. The results are shown in Table 1.

TABLE 1

| | Step 1 | | | Step 2 | | | Amount of PFOA (ppb) | Amount of PFC (ppb) | Melt viscosity (Pa·s) |
|---|---|---|---|---|---|---|---|---|---|
| | Temperature | Atmosphere | Irradiation dose | Temperature | Atmosphere | Irradiation dose | | | |
| Comparative Example 1 | Room temperature | Air | 200 kGy | | | None | 122 | 255 | $1.2 \times 10^4$ |
| Example 1 | Room temperature | Air | 200 kGy | Room temperature | Air | 1 kGy | <5 | <5 | $1.2 \times 10^4$ |
| Example 2 | Room temperature | Air | 200 kGy | Room temperature | Air | 2 kGy | <5 | <5 | $1.6 \times 10^4$ |
| Example 3 | Room temperature | Air | 200 kGy | Room temperature | Air | 4 kGy | <5 | <5 | $1.2 \times 10^4$ |
| Example 4 | Room temperature | Air | 200 kGy | Room temperature | Air | 8 kGy | <5 | <5 | $1.2 \times 10^4$ |
| Comparative Example 2 | Room temperature | Air | 201 kGy | | | None | 122 | 270 | $1.2 \times 10^4$ |
| Comparative Example 3 | Room temperature | Air | 205 kGy | | | None | 128 | 274 | $1.2 \times 10^4$ |
| Comparative Example 4 | Room temperature | Air | 208 kGy | | | None | 131 | 282 | $1.4 \times 10^4$ |

The invention claimed is:

1. A method for producing low molecular weight polytetrafluoroethylene, comprising:
   (1) irradiating high molecular weight polytetrafluoroethylene to provide low molecular weight polytetrafluoroethylene having a melt viscosity of $1.0 \times 10^2$ to $7.0 \times 10^5$ Pa·s at 380° C.; and
   (2) irradiating the low molecular weight polytetrafluoroethylene to a dose that does not decompose the low molecular weight polytetrafluoroethylene.

2. The production method according to claim 1, wherein the dose in the step (2) is 0.1 to 25 kGy.

3. The production method according to claim 1, wherein the low molecular weight polytetrafluoroethylene obtained after the step (2) is substantially free from a C6-C14 perfluorocarboxylic acid and its salt.

4. The production method according to claim 1, wherein the high molecular weight polytetrafluoroethylene has a standard specific gravity of 2.130 to 2.230.

5. The production method according to claim 1, wherein both the high molecular weight polytetrafluoroethylene and the low molecular weight polytetrafluoroethylene are in the form of powder.

6. The production method according to claim 1, further comprising
   (3) heating the high molecular weight polytetrafluoroethylene up to a temperature that is not lower than the primary melting point thereof to provide a molded article before the step (1), the molded article having a specific gravity of 1.0 g/cm³ or higher.

* * * * *